(12) United States Patent
Sato et al.

(10) Patent No.: US 10,596,990 B2
(45) Date of Patent: Mar. 24, 2020

(54) HEAD-PROTECTING AIRBAG DEVICE

(71) Applicant: TOYODA GOSEI CO., LTD., Kiyosu-shi, Aichi-ken (JP)

(72) Inventors: Jun Sato, Kiyosu (JP); Osamu Hirose, Kiyosu (JP); Ryosuke Jinnai, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 36 days.

(21) Appl. No.: 16/006,907

(22) Filed: Jun. 13, 2018

(65) Prior Publication Data
US 2019/0001912 A1   Jan. 3, 2019

(30) Foreign Application Priority Data
Jun. 30, 2017 (JP) ................. 2017-128330

(51) Int. Cl.
| | |
|---|---|
| *B60R 21/213* | (2011.01) |
| *B60R 21/201* | (2011.01) |
| *B60R 21/231* | (2011.01) |
| *B60R 21/232* | (2011.01) |
| *B62D 65/14* | (2006.01) |

(Continued)

(52) U.S. Cl.
CPC .......... *B60R 21/213* (2013.01); *B60R 21/201* (2013.01); *B60R 21/232* (2013.01); *B60R 21/237* (2013.01); *B60R 21/23138* (2013.01); *B62D 65/022* (2013.01); *B62D 65/14* (2013.01); *B60R 2021/0048* (2013.01); *B60R 2021/23161* (2013.01)

(58) Field of Classification Search
CPC ..... B60R 21/20; B60R 21/213; B60R 21/232; B60R 21/201; B60R 21/237; B62D 65/022; B62D 65/14
See application file for complete search history.

(56) References Cited

U.S. PATENT DOCUMENTS

| | | | | |
|---|---|---|---|---|
| 7,331,598 | B2 * | 2/2008 | Inazu ................... | B60R 21/213 280/728.2 |
| 7,748,734 | B2 * | 7/2010 | Wilmot ................ | B60R 21/201 280/728.2 |

(Continued)

FOREIGN PATENT DOCUMENTS

DE   10 2010 037 420 A1   1/2012

*Primary Examiner* — Paul N Dickson
*Assistant Examiner* — Kurtis Nielson
(74) *Attorney, Agent, or Firm* — Posz Law Group, PLC

(57) ABSTRACT

A head-protecting airbag device includes: an airbag loaded in a vehicle as a completely folded body folded to be storable in the storage portion; and a regulation member, to be arranged near a bent portion in the completely folded body at a time of conveyance. The regulation member is formed of a belt-shaped body having flexibility, and capable of regulating a twist of the completely folded body at the bent portion when the completely folded body is assembled into the vehicle. In a state where a protrusion part is engaged with a periphery of an assembly hole, both front and rear sides of the protrusion part are wrapped together with the completely folded body by a wrapping material. A length dimension of a portion between the assembly holes is set to be a length dimension which disenables one turn of twist in a circumferential direction of the completely folded body.

4 Claims, 10 Drawing Sheets

(51) Int. Cl.
 *B62D 65/02* (2006.01)
 *B60R 21/237* (2006.01)
 *B60R 21/00* (2006.01)

(56) References Cited

U.S. PATENT DOCUMENTS

| 7,762,581 B2 * | 7/2010 | Kino | B60R 21/232 |
| | | | 280/728.2 |
| 8,157,290 B2 * | 4/2012 | Kjell | B60R 21/232 |
| | | | 280/730.2 |
| 8,876,150 B2 * | 11/2014 | Min | B60R 21/232 |
| | | | 280/728.2 |

* cited by examiner

FIG.4
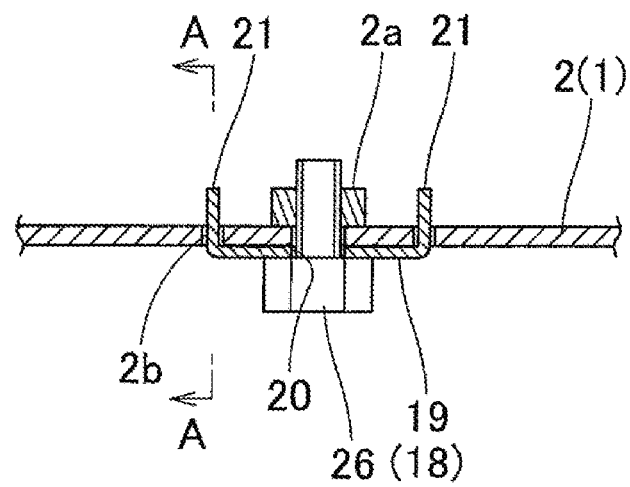
SECTIONAL VIEW OF A-A PORTION
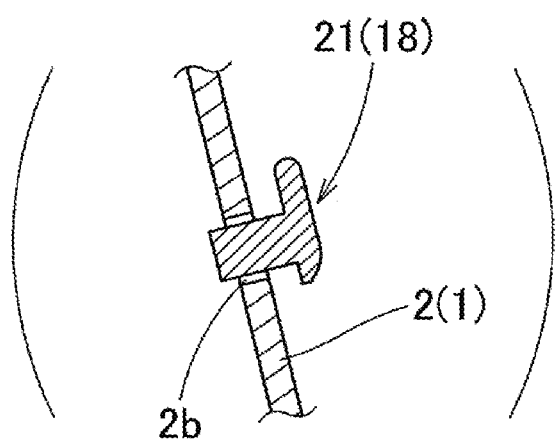

FRONT SIDE ← → REAR SIDE

I        O

HEAD-PROTECTING AIRBAG DEVICE

CROSS-REFERENCE TO RELATED APPLICATION(S)

This application is based upon and claims the benefit of priority from Japanese Patent Application No. 2017-128330, filed on Jun. 30, 2017, the entire contents of which are incorporated herein by reference.

BACKGROUND

1. Field of the Invention

The present invention relates to a head-protecting airbag device which has an airbag which covers a window of a vehicle when deployed and inflated and is stored in a storage portion formed in an upper edge on an inboard side of the window in a state where an upper edge is mounted and fixed in a body of the vehicle.

2. Description of the Related Art

In the related art, in many cases, a head-protecting airbag device is conveyed in the state of a long completely folded body in which an airbag is folded to be storable in a storage portion. The completely folded body is long and thus is conveyed in the state of being bent in a predetermined place. Further, in a case where the completely folded body is conveyed in the state of being bent in the predetermined place as above, the bent state is recovered to be assembled with the vehicle, but a twist may occur in the bent portion at the time of assembly. In order to detect the occurrence of such a twist, the head-protecting airbag device is configured such that a belt-shaped body having flexibility is arranged in the bent portion of the completely folded body (for example, see German Patent application publication No. 102010037420).

In the head-protecting airbag device of the related art, the belt-shaped body is mounted in the completely folded body by engaging both ends to protrusion parts protruding from the completely folded body.

However, in the head-protecting airbag device of the related art, the belt-shaped body is not intended to regulate the twist occurring in the bent portion, but is intended to check presence and absence of the twist at the time of assembly in the vehicle by visually observing the portion of the belt-shaped body. Thus, there is room for improvement in terms of regulating accurately that the twist occurs in the completely folded body at the time of assembly in the vehicle.

SUMMARY

The invention has been made to solve the above-described problems, and an object thereof is to provide a head-protecting airbag device which can regulate a twist occurring in an area of a bent portion at the time of conveying in the completely folded body with a simple configuration.

According to an aspect of the invention, there is provided a head-protecting airbag device including: an airbag which is configured to cover a window of a vehicle at a time of deployment and inflation and is stored in a storage portion formed in an upper edge on an inboard side of the window in a state where an upper edge is mounted and fixed in a body of the vehicle, the airbag being loaded in the vehicle as a long completely folded body folded to be storable in the storage portion, and the completely folded body being bent at a predetermined place to be conveyable before being loaded in the vehicle; and a regulation member to be arranged near a bent portion in the completely folded body at a time of conveyance, the regulation member being formed of a belt-shaped body having flexibility and being capable of regulating a twist of the completely folded body at the bent portion when the completely folded body is assembled into the vehicle, wherein: the regulation member includes an assembly hole on each of both ends, which is configured to be engaged with a protrusion part formed to protrude from the completely folded body; in a state where the protrusion part is engaged with a periphery of the assembly hole, both front and rear sides of the protrusion part are wrapped together with the completely folded body by a wrapping material, in which a wrapping state is releasable at a time of inflation of the airbag, thereby being mounted in the completely folded body; and a length dimension of a portion between the assembly holes is set to be a length dimension which disenables one turn of twist in a circumferential direction of the completely folded body.

In the head-protecting airbag device of the invention, the regulation member which is arranged near the bent portion at the time of conveyance in the completely folded body formed by folding the airbag is configured to regulate the twist of the completely folded body at the bent portion. Specifically, the regulation member is set such that the length dimension of the portion between the assembly holes is a length dimension that disenables one turn of twist in the circumferential direction of the completely folded body. That is, in the head-protecting airbag device of the invention, before the completely folded body is rotated by one turn, the regulation member is twisted and stretched together with the outer circumference of the completely folded body not to be rotated further. Thus, it can be regulated accurately that when the completely folded body is assembled with the vehicle after the conveyance, the completely folded body is twisted to be rotated by one turn in the bent portion. In addition, in a state where both ends of the regulation member formed as a belt-shaped body are engaged in the protrusion parts protruding from the completely folded body, the wrapping materials in which the wrapping state is releasable at the time of inflation of the airbag wind the completely folded body in the positions of both front and rear sides of the protrusion parts, whereby the regulation member is mounted in the completely folded body. Thus, the regulation member is simply mounted in the completely folded body, and it can be accurately prevented that the protruding body is deviated from the assembly hole. For this reason, in the head-protecting airbag device of the invention, even when the head-protecting airbag device includes the regulation member which regulates the twist of the completely folded body, the head-protecting airbag device can be configured to be compact without getting bulky. In addition, it can be prevented that the completely folded body is twisted to be rotated by one turn. Thus, when the twist occurs, the posture of the completely folded body becomes unnatural. The twist state can be directly recognized visibly, thereby accurately preventing the twist of the completely folded body.

Therefore, in the head-protecting airbag device of the invention, with the simple configuration, the twist occurring in the area of the bent portion at the time of conveyance of the completely folded body can be regulated.

In the above-described head-protecting airbag device, at least one of the protrusion parts may be formed of a mounting unit for mounting and fixing the upper edge of the airbag in the body, and an opening shape of the assembly hole into which the mounting unit is inserted may be formed such that a center in a direction along the completely folded body is widened, and both ends in the direction along the completely folded body are narrowed. In the head-protecting airbag device, the mounting unit can be smoothly inserted into the assembly hole. Compared to a case where the assembly hole is formed simply in a slit shape, when the mounting unit is mounted in the body, the central portion in the front and rear direction, the central area in the direction along the completely folded body in the periphery of the assembly hole hardly enters between the mounting unit and the member on the body side, and it can be accurately prevented that the area is interposed in the area between the mounting unit and the member on the body side, which is preferable.

In the above-described head-protecting airbag device, the completely folded body may be stored in a case made of a synthetic resin and is loaded in the vehicle, and the regulation member may be arranged in an outer circumference of the case in a vicinity of a boundary portion of the cases arranged adjacently. It can be accurately prevented that the twist occurs in the area between the cases, which is preferable.

In the above-described head-protecting airbag device, the regulation member may include mounting pieces including the assembly holes and a connection part connecting the mounting pieces, and the connection part may be set such that a width dimension is smaller than a width dimension of the mounting piece. Compared to a case where the width dimension of the connection part is set to be substantially the same as the width dimension of the mounting piece, the reduction in weight can be achieved, and a bending operation of the completely folded body at the time of conveyance is facilitated. In addition, it can be suppressed that the connection part interferes with the peripheral member, which is preferable.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 4 is a partially enlarged lateral sectional view in a font and rear direction illustrating a state where a mounting piece is mounted in an inner panel in the head-protecting airbag device of the embodiment, and is a partially enlarged vertical sectional view illustrating an engaging claw part in the mounting piece;

DETAILED DESCRIPTION OF THE INVENTION

Figure 1:
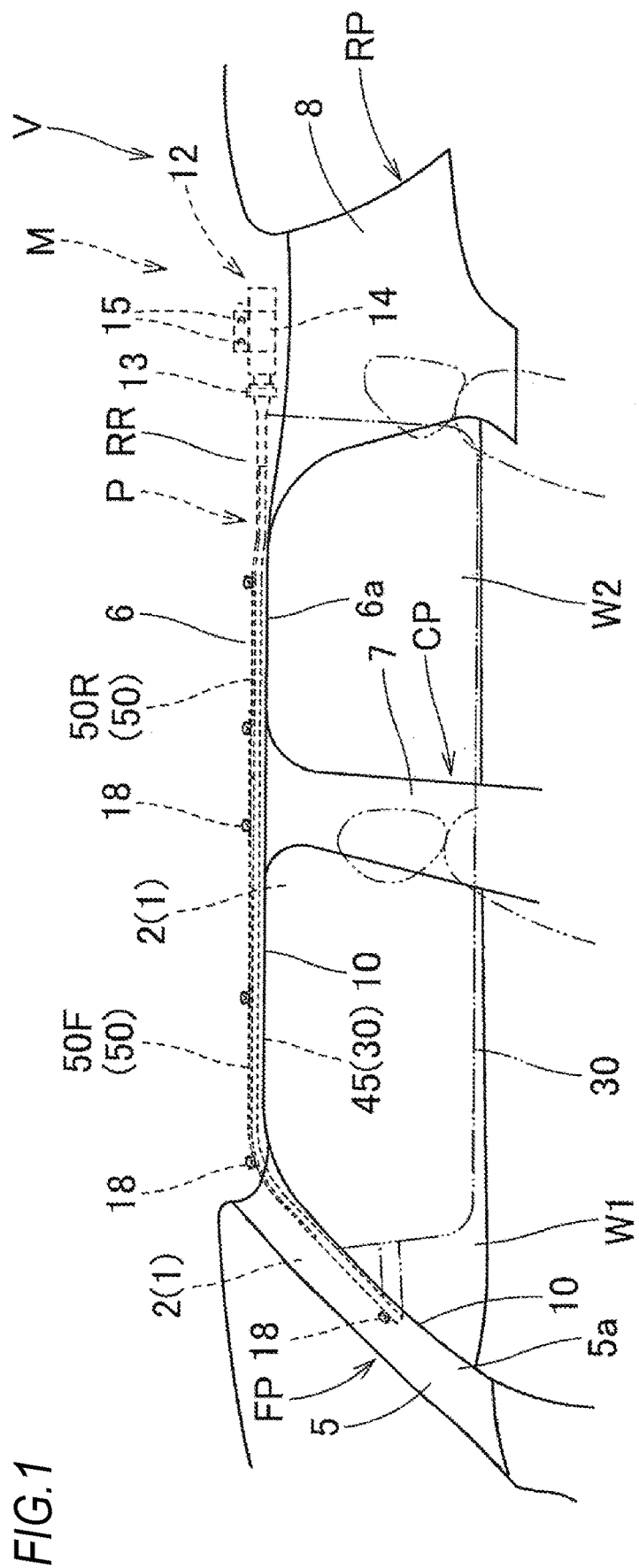
FIG. 1 is a schematic front view illustrating a head-protecting airbag device according to one embodiment of the invention when viewed from an inboard side.

Hereinafter, one embodiment of the invention will be described with reference to the drawings. As illustrated in FIG. 1, in a head-protecting airbag device M of the embodiment, an airbag 30 is stored in a storage portion P formed in the upper edge on the inboard side of windows W1 and W2 such that the windows (side window) W1 and W2 of the vehicle V can be covered at the time of completion of inflation. Specifically, when the periphery of the windows W1 and W2 which is in a range from a front pillar part FP to a vicinity of an upper side of a rear pillar part RP through a roof side rail part RR is set as the storage portion P, the airbag 30 is folded and stored in the storage portion P. Incidentally, in the case of the embodiment, the vehicle V is configured such that one central pillar part CP is arranged along a substantially vertical direction between the front pillar part FP and the rear pillar part RP. Further, as illustrated in a two-dot chain line of FIG. 1, the airbag 30 at the time of completion of inflation is configured to cover an inboard side of a portion of a central pillar garnish arranged in the central pillar part CP or a rear pillar garnish 8 arranged in a rear pillar part RP in addition to the windows W1 and W2.

Figure 2:
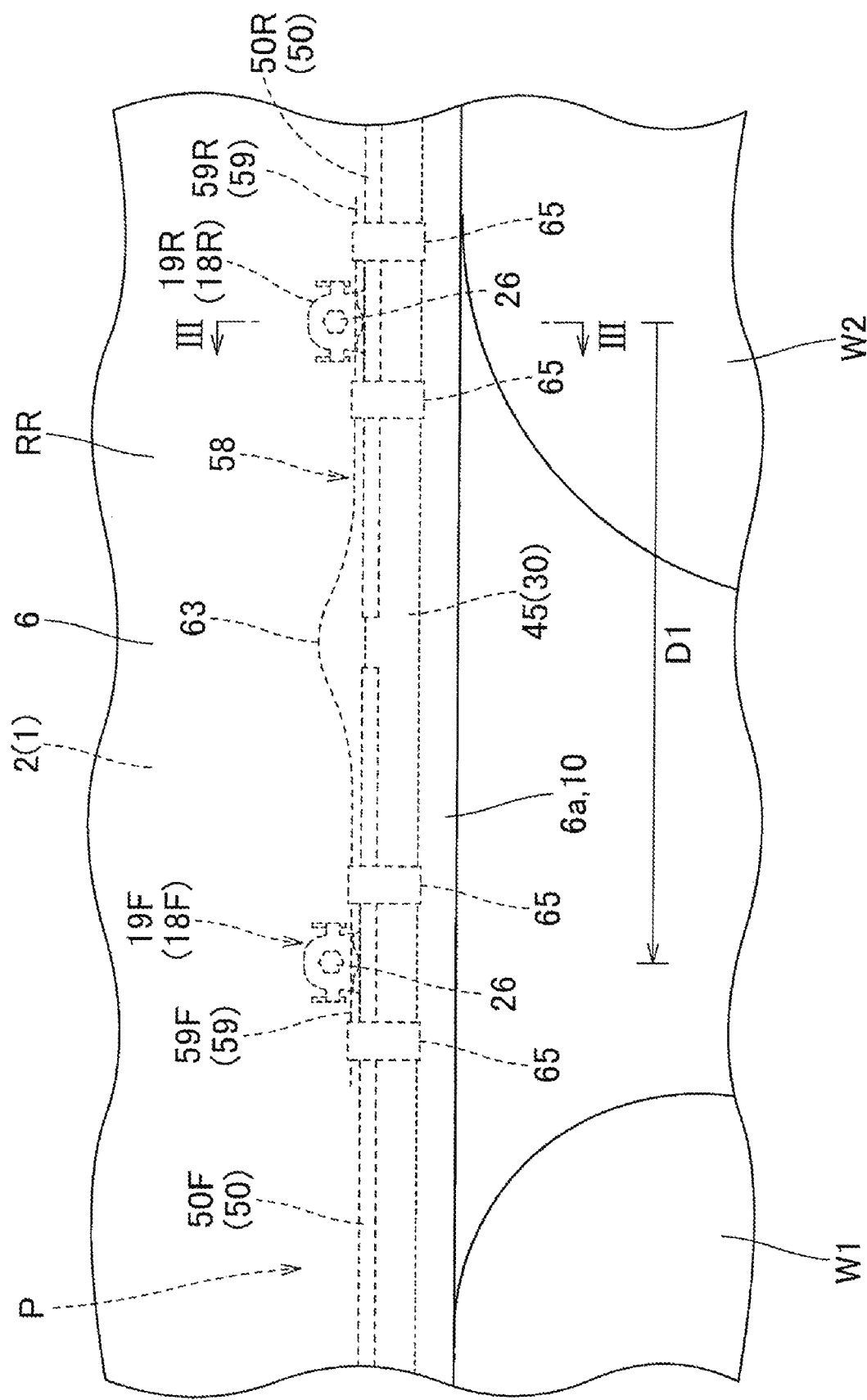
FIG. 2 is a partially enlarged front view illustrating an arranged area of a regulation member in the head-protecting airbag device of the embodiment.
Figure 3:
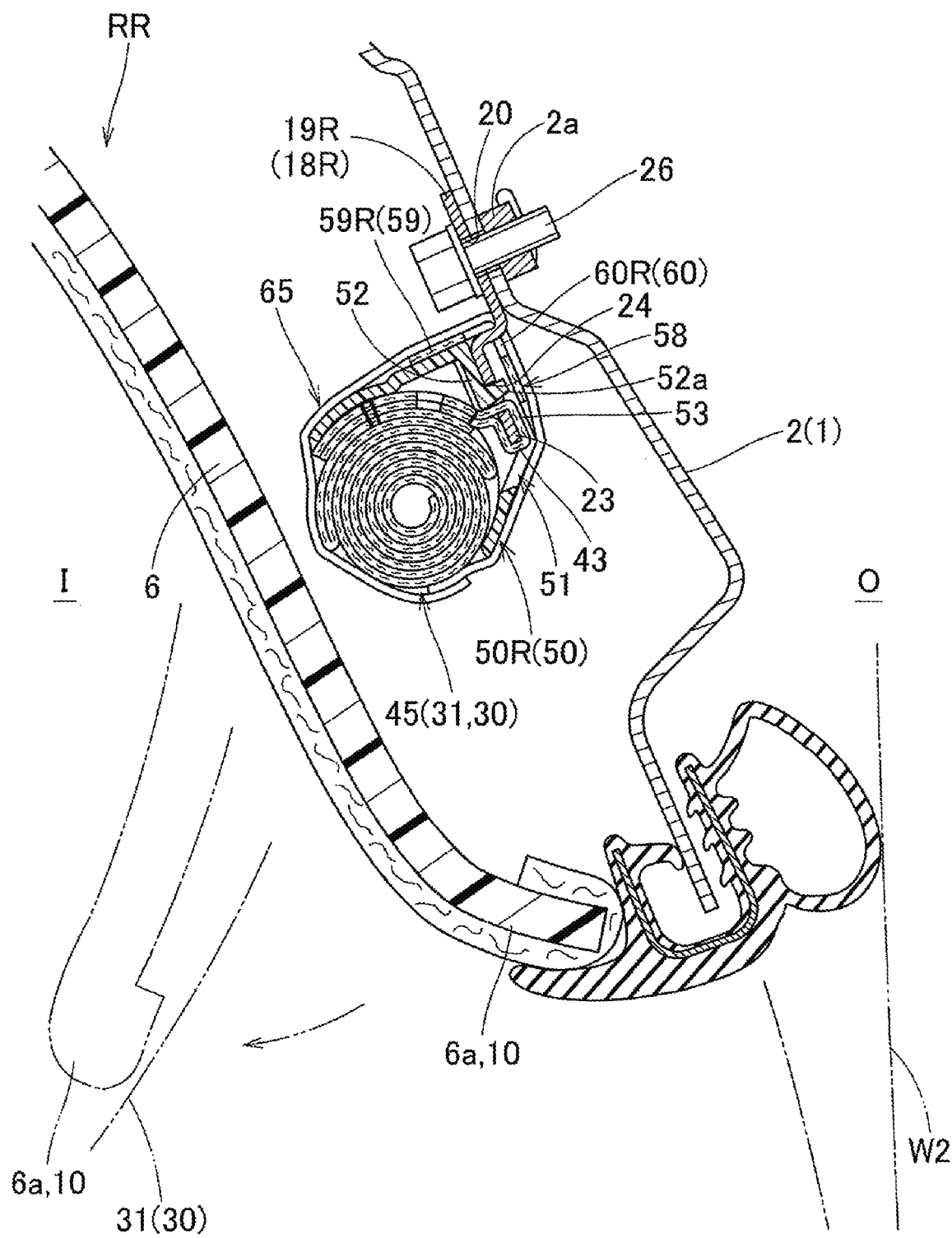
FIG. 3 is a sectional view of portion of FIG. 2.

As illustrated in FIGS. 1 to 3, the head-protecting airbag device M includes the airbag 30, an inflator 12 which supplies an inflation gas to the airbag 30, a mounting bracket 14 which mounts the inflator 12 in a body 1, a mounting bracket 18 which mounts the airbag 30 in the body 1, cases 50F and 50R which store the folded airbag 30 (completely folded body 45), and a regulation member 58 which enables regulation of the twist of the completely folded body 45 at the time of assembly in the vehicle V. The folded airbag 30 (completely folded body 45), the inflator 12, the cases 50F and 50R, and the regulation member 58 include the mounting brackets 14 and 18, and are stored in the storage portion P when loaded in the vehicle V in a state where the inboard side I is covered with the airbag cover 10 (see FIGS. 1 to 3). In the case of the embodiment, the airbag cover 10 is constituted by a lower edge 5a of the front pillar garnish 5 which covers the inboard side of the front pillar part FP and a lower edge 6a of a roof head liner 6 which covers the inboard side of the roof side rail part RR.

The front pillar garnish 5 and the roof head liner 6 are made of synthetic resin together with the central pillar garnish 7 and the rear pillar garnish 8, and are mounted on an inboard side I of an inner panel 2, which a member on the body 1 side in the front pillar part FP or the roof side rail part RR, by a mounting unit (not illustrated). Further, the airbag cover 10 constituted by the lower edges 5a and 6a of the front pillar garnish 5 and the roof head liner 6 is configured such that the lower edges 5a and 6a are openable to the inboard side I by being pressed by the airbag 30 and the airbag 30 can protrude during deployment and inflation (see a two-dot chain line of FIG. 3).

The inflator 12 supplies the inflation gas to the airbag 30. As illustrated in FIG. 1, the inflator is an almost columnar cylinder type, and a gas discharge outlet (not illustrated) which can discharge the inflation gas is arranged on the tip side. In the inflator 12, the tip including the vicinity of the gas discharge outlet is inserted into a connection opening part 35 (to be described later) of the airbag 30, and the inflator is connected in the airbag 30 by using a clamp 13 arranged in the outer circumference of the connection opening part 35. In addition, the inflator 12 is mounted in a position above the rear pillar part RP in the inner panel 2 by using the mounting bracket 14 which holds the inflator 12 and a the bolt 15 for fixing the mounting bracket 14 in the inner panel 2 of the body 1 (see FIG. 1).

Figure 6:
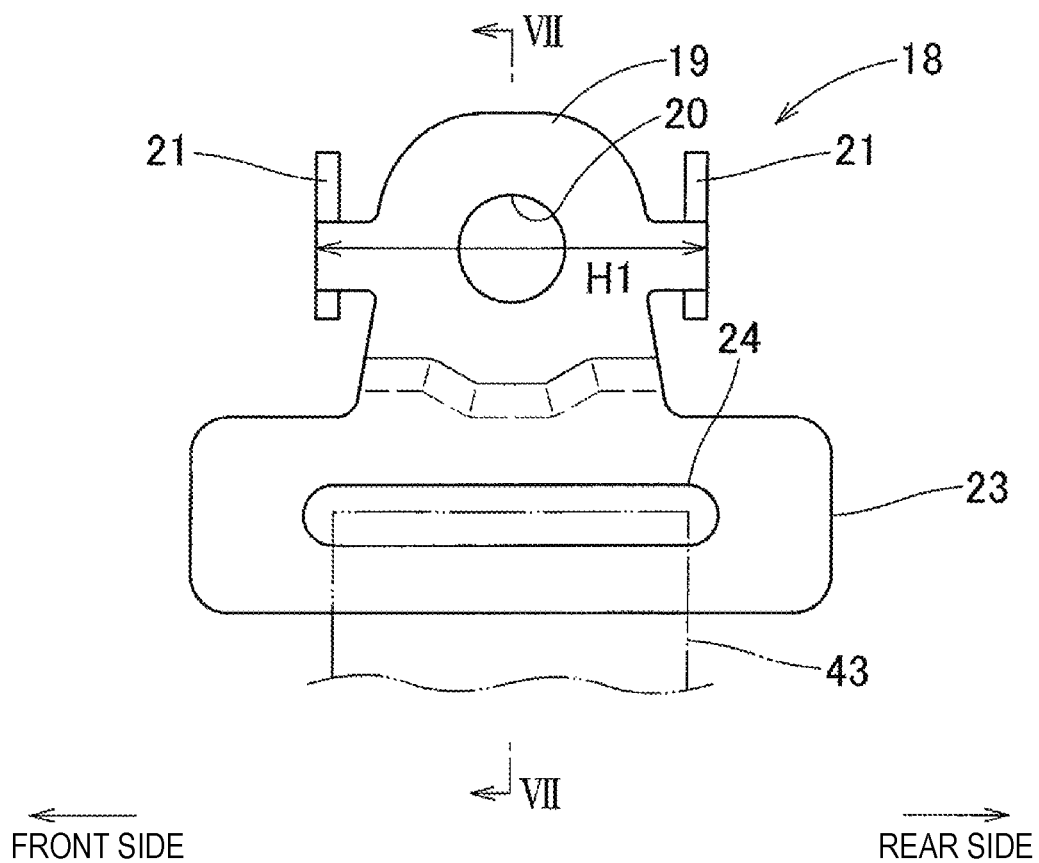
FIG. 6 is a front view illustrating a mounting bracket used in the head-protecting airbag device of the embodiment.
Figure 7:
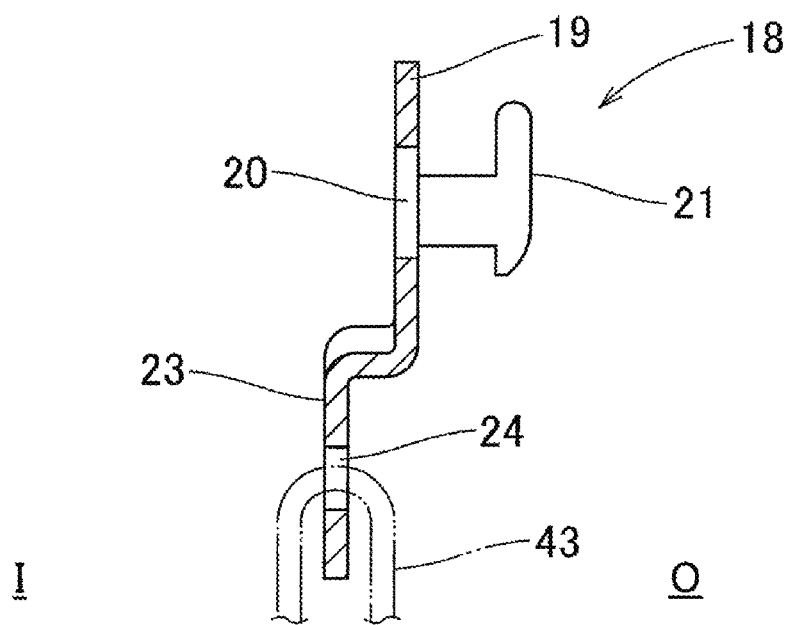
FIG. 7 is a sectional view of VII-VII portion of FIG. 6.

As illustrated in FIGS. 1 to 3 and 5, the mounting bracket 18 is a member for mounting the upper edge 31a of the airbag 30 (airbag body 31) in the body side of the upper edges of the windows W1 and W2. In the case of the embodiment, as illustrated in FIGS. 6 and 7, the mounting bracket 18 is formed by bending single sheet metal plate, has a mounting piece 19 to be mounted in the body 1 and a connection plate part 23 which connects the airbag body 31 in the root part of the mounting piece 19, and is formed in an almost symmetrical shape in the front and rear direction.

The mounting piece 19 configures the mounting unit which is inserted into an assembly hole 60 of the regulation member 58 (to be described later). The mounting piece is a plate shape along the substantially vertical direction along the inner panel 2, and includes an inserting hole 20 to which the bolt 26 as a fixing unit for fixation in the inner panel 2 can be inserted. In addition, as illustrated in FIG. 4, in both front and rear edges of the mounting piece 19, engaging claw parts 21 which can be engaged and locked in a periphery of engagement holes 2b formed in the inner panel 2 when the mounting piece 19 is mounted in the inner panel 2 are formed to protrude upward to the outboard side O as the inner panel 2 side (see FIG. 7).

The connection plate part 23 is formed to extend downward from the lower end of the mounting piece 19. In the case of the embodiment, when viewed from the front and rear direction, the connection plate part is arranged in a step shape to be positioned on the inboard side I from the mounting piece 19 with respect to the mounting piece 19. In the connection plate part 23, a connection hole 24 which connects a connection tap 43 (to be described later) of the airbag 30 is formed to be open in a long shape of which the longitudinal side is substantially along the front and rear direction.

The mounting bracket 18 connects the connection tap 43 in such a manner that the loop-shaped connection tap 43 which is formed to protrude from the upper edge 31a of the airbag body 31 in the airbag 30 is inserted into the connection hole 24 formed in the connection plate part 23. Further, in the mounting bracket 18, the mounting piece 19 is temporarily fixed in a predetermined position of the inner panel 2 in such a manner that an engaging claw part 21 is engaged in the periphery of the engagement hole 2b formed in the inner panel 2. The mounting piece 19 is mounted in the inner panel 2 in such a manner that the bolt 26 as a fixing unit is inserted into the inserting hole 20 formed in the mounting piece 19 and is fastened by a nut 2a firmly fixed in the inner panel 2, whereby the upper edge 31a of the airbag 30 (airbag body 31) is mounted on the body 1 side of the upper edge of the windows W1 and W2 (see FIG. 3).

Figure 5:
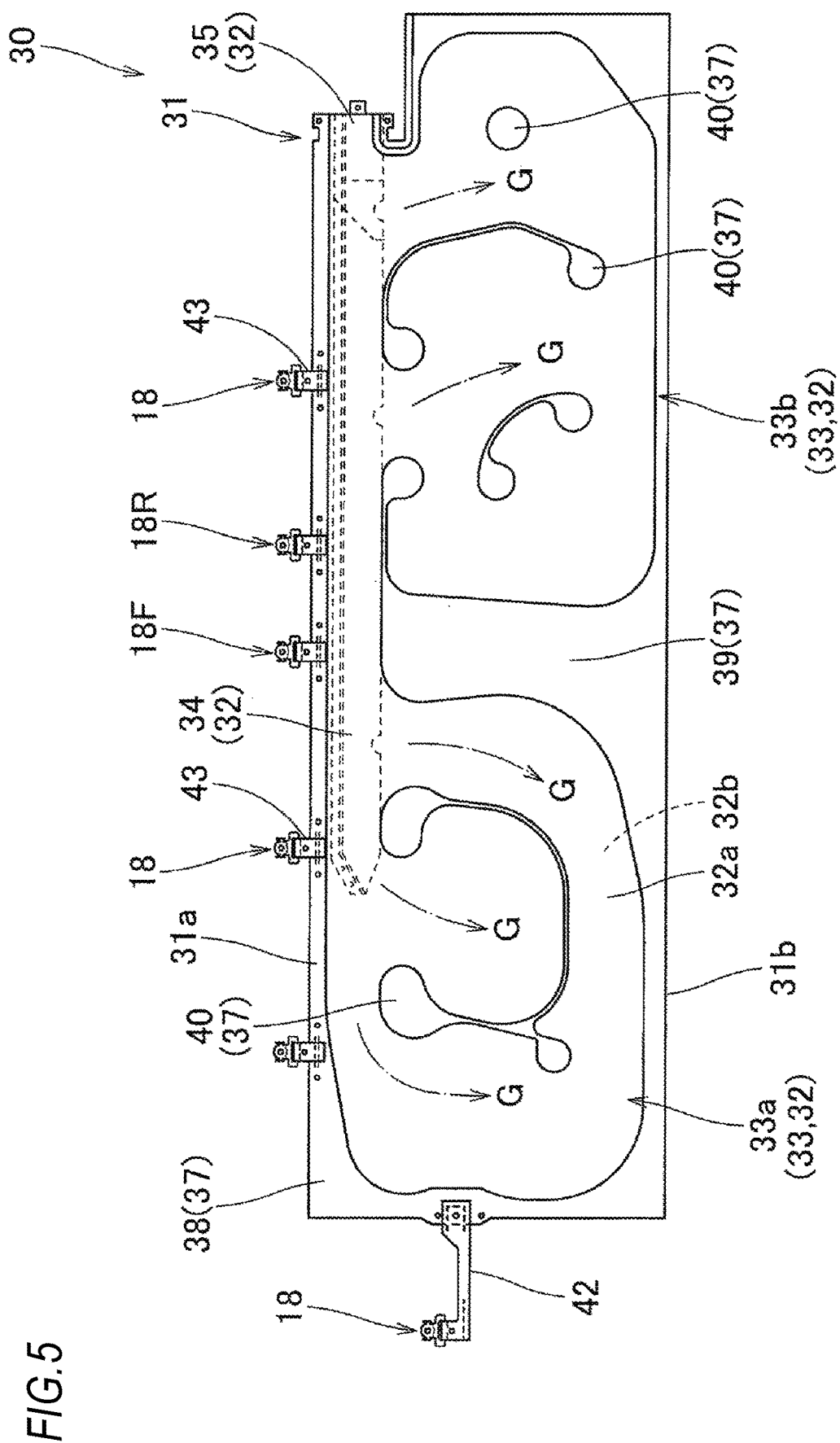
FIG. 5 is a front view illustrating a state where an airbag used in the head-protecting airbag device of the embodiment is deployed flatly.

As illustrated in FIG. 5, the airbag 30 includes the airbag body 31 and the connection tap 43 which protrudes upward from the upper edge 31a of the airbag body 31 to be connected with the mounting bracket 18.

As illustrated by a two-dot chain line of FIG. 1, the airbag body 31 is configured to be deployed and inflated such that the inflation gas is allowed to flow inside from the inflator 12 and the airbag body is deployed from the folded shape to cover the windows W1 and W2 and the inboard side of the central pillar garnish 7 and the rear pillar garnish 8 in the central pillar part CP and the rear pillar part RP. As illustrated in FIG. 5, the airbag body 31 includes a gas admissive part 32 which allows an inflation gas G to flow inside such that the airbag body is inflated to separate an inboard wall part 32a and an outboard wall part 32b and a non-admissive part 37 which is formed to couple the inboard wall part 32a and the outboard wall part 32b to each other and does not allow the inflation gas to flow inside. In the case of the embodiment, the gas admissive part 32 includes an inflatable part 33, a gas guidance path 34 which allows the inflation gas to flow in the protection inflatable part 33, and the connection opening part 35. The non-admissive part 37 includes a periphery part 38, a plate-shaped part 39, and a closed part 40.

As illustrated in FIG. 5, the protection inflatable part 33 of the gas admissive part 32 includes a front protecting part 33a which covers the window W1 on a side of a front seat at the time of completion of inflation of the airbag 30 and a rear protecting part 33b which covers the window W2 on a side of a rear seat. In the upper edge 31a of the airbag body 31, the gas guidance path 34 is arranged to extend substantially along the front and rear direction. The gas guidance path is configured to guide the inflation gas G discharged from the inflator 12 to the protection inflatable part 33 (front protecting parts 33a and 33b) arranged below the gas guidance path 34. In the case of the embodiment, in the rear end of the gas guidance path 34, the connection opening part 35 is formed to protrude rearward from the airbag body 31, and the rear end side is open to enable the connection of the inflator 12. In each of the front protecting part 33a and the rear protecting part 33b, the closed part 40 is arranged in the inner area such that the width dimension in the front and rear direction in the flatly-deployed state narrows at the time of completion of inflation of the airbag 30, and the thickness is regulated, so as to maintain the plate shape extending in the front and rear direction.

The periphery part 38 in the non-admissive part 37 is formed to surround the outer periphery of the gas admissive part 32 over the entire area excluding the rear end side of the connection opening part 35. The plate-shaped part 39 is arranged between the front protecting part 33a and the rear protecting part 33b and is formed in a substantially rectangular plate shape.

In the case of the embodiment, the airbag body 31 is formed by a hollow weaving method which uses a polyamide yarn, a polyester yarn, or the like. The connection tap 43 is configured to be separated from the airbag body 31.

The connection tap 43 is a portion for mounting the upper edge 31a of the airbag body 31 in the inner panel 2 of the body 1 of the vehicle V. As illustrated in FIG. 5, the connection taps are arranged in plural places (in the case of the embodiment, five places) along the front and rear direction to protrude from the upper edge 31a of the airbag body 31. Each connection tap 43 is formed of a woven fabric using a polyamide yarn, a polyester yarn, or the like and has a belt shape of which the width dimension is set to enable the insertion into the connection hole 24 in the mounting bracket 18. In the state of connecting the mounting bracket 18, the connection tap is connected with the airbag body 31 by coupling (sewing) the both ends inserted into the connection hole 24 with the upper edge 31a of the airbag body 31.

The airbag body 31 includes a connection belt 42 which extends forward from the front end such that the front end is mounted in the body 1. The connection belt 42 is also configured to be separated from the airbag body 31. In the case of the embodiment, the connection belt 42 is arranged in the front end of the airbag body 31 to extend forward from the position slightly above the vertical center in the flatly-deployed state. Similarly to the connection tap 43, the front end of the connection belt 42 is mounted and fixed in the inner panel 2 in the portion of the front pillar part FP by using the mounting bracket 18 (see FIG. 1).

In the airbag 30, the lower edge 31b is brought close to the upper edge 31a from the flatly-deployed state such that the inboard wall part 32a and the outboard wall part 32b are overlapped, and the airbag is folded to form the completely folded body 45 which is long along the front and rear direction and is loaded in the vehicle V. In the embodiment, as illustrated in FIG. 3, in the airbag 30, the portion of the gas guidance path 34 which is an area on the upper edge 31a side in the airbag body 31 is bellows-folded at a plurality of folding line parts along the front and rear direction, and the portion of the protection inflatable part 33 below the gas guidance path 34 is roll-folded such that the lower edge 31b is wound toward the outboard side. Further, in the embodiment, the airbag body 31 is folded, and a wrapping materials for collapse prevention which is breakable at a predetermined place winds therearound. Then the connection tap 43 in the state of being inserted into the connection hole 24 of the mounting bracket 18 is sewn with the upper edge 31a of the airbag body 31 exposed on the upper surface by using a suture.

In the case of the embodiment, as illustrated in FIGS. 1 and 2, a case 50 which stores the folded airbag 30 (completely folded body 45) is arranged along the longitudinal direction of the completely folded body 45. The case 50 has two of a case 50F which stores the entire area of the protecting part 33a and a case 50R which stores the area of the rear protecting part 33b. In the case of the embodiment, the cases 50F and 50R are formed from a polyolefin thermoplastic elastomer (TPO). As illustrated in FIG. 3, the cases 50F and 50R are configured to cover an area from the outboard side O of the completely folded body 45 to the upper surface. In addition, in each of the case 50 (50F and 50R), an engaging part 51 for engagement with the connection plate part 23 of the mounting bracket 18 is formed in the portion in which the mounting bracket 18 protruding from the completely folded body 45 is arranged. The engaging part 51 is formed with an engaging claw part 52 which is arranged on the inboard side I of the connection plate part 23 to engage the connection plate part 23 and an insertion opening 53 for allowing the mounting piece 19 of the mounting bracket 18 to protrude upward on the outboard side. The tip of the engaging claw part 52 is formed with a claw body 52a inserted into the connection hole 24. The mounting bracket 18 is mounted in the case 50 such that the movement with respect to the case 50 is regulated while a state where the mounting piece 19 protrudes upward on the outboard side is maintained in a state where the completely folded body 45 is stored in the case 50 and the connection plate part 23 is engaged with the engaging claw part 52.

In a state where the completely folded body 45 is stored in the cases 50F and 50R, the mounting piece 19 of the mounting bracket 18 protruding from the cases 50F and 50R configures the protrusion part which is assembled with the regulation member 58. Specifically, a mounting piece 19F of a mounting bracket 18F arranged in the vicinity of the rear end of the front case 50F and a mounting piece 19R of a mounting bracket 18R arranged in the vicinity of the front end of the rear case 50R are engaged in the periphery of assembly holes 60F and 60R formed in the regulation member 58.

The regulation member 58 is formed of a belt-shaped body having flexibility. In the case of the embodiment, similarly to the connection tap 43, the regulation member is formed of single woven fabric using a polyamide yarn, a polyester yarn, or the like. The regulation member 58 has, in both ends, the assembly holes 60F and 60R in which the mounting pieces 19F and 19R of the mounting brackets 18F and 18R formed to protrude from the completely folded body 45 (cases 50F and 50R) are engageable. Specifically, the regulation member includes two mounting pieces 59F and 59R (59) having the assembly holes 60F and 60R (60) and a connection part 63 connecting the mounting pieces 59F and 59R (see FIGS. 8 and 9).

A mounting piece 59 is configured to have a substantially rectangular shape in which an outer shape is widened in the front and rear direction (a direction along the completely folded body 45). The assembly hole 60 formed in the mounting piece 59 is formed such that the mounting piece 19 of the mounting bracket 18 is insertable thereinto together with the engaging claw parts 21 formed to protrude toward both front and rear edges. The opening shape is configured such that the central side (the central side in the front and rear direction) in a direction along the completely folded body 45 is widened, and the both end sides (the both end sides in the front and rear direction) in the direction along the completely folded body 45 are narrowed. In the case of the embodiment, the assembly hole 60 is formed in a substantially rhombic shape. In detail, in the embodiment, the assembly hole 60 is set in a substantially rhombic shape in which the width dimension of the opening in the front and rear direction is set to be long, such that an opening width dimension OW2 in an inboard and outboard direction is set to be about half an opening width dimension OW1 in the front and rear direction (see FIG. 8). The opening shape of the assembly hole 60 is set such that the mounting piece 19 of the mounting bracket 18 is smoothly insertable thereinto together with the engaging claw part 21. The opening width dimension OW1 in the front and rear direction is set to be slightly larger than a width dimension H1 (see FIG. 6) in the front and rear direction of the mounting piece 19. In addition, in the mounting piece 59, each of both front and rear areas of the assembly hole 60 serves as a wound portion 61 which is wound by a tape material 65 as a wrapping material (to be described later). Therefore, the width dimension in the front and rear direction is set to be larger than the tape material 65 such that the tape material 65 can wind the wound portion.

Figure 8:
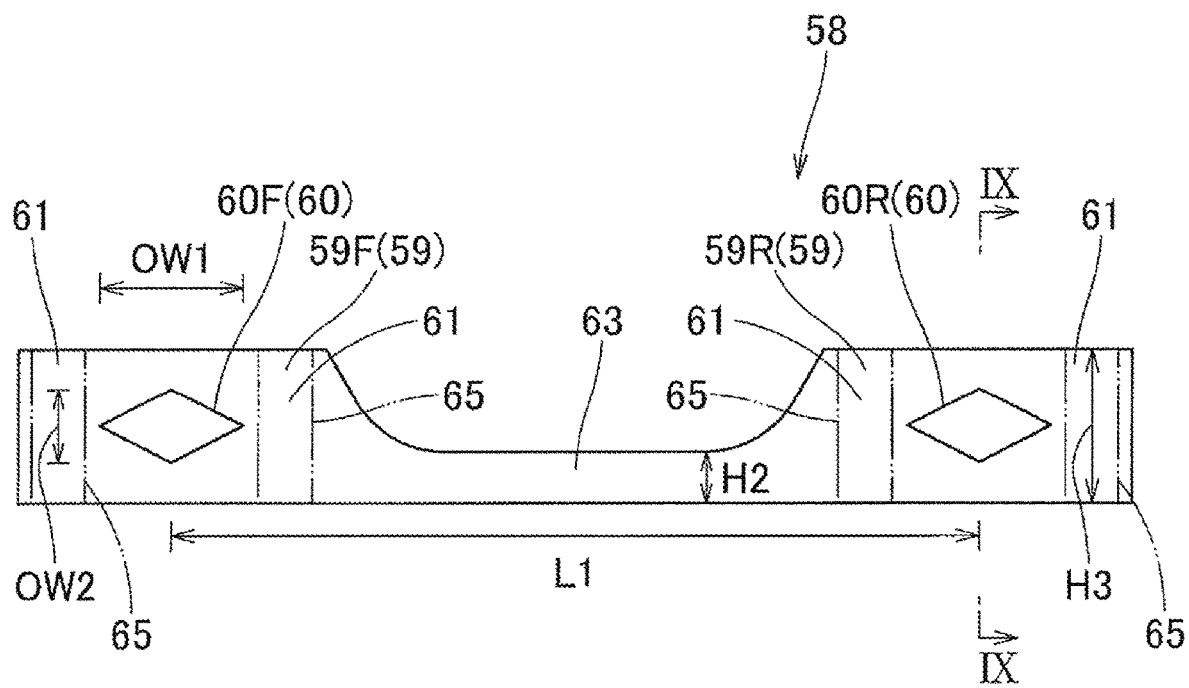
FIG. 8 is a plan view illustrating a state where the regulation member used in the head-protecting airbag device of the embodiment is deployed flatly.
Figure 9:
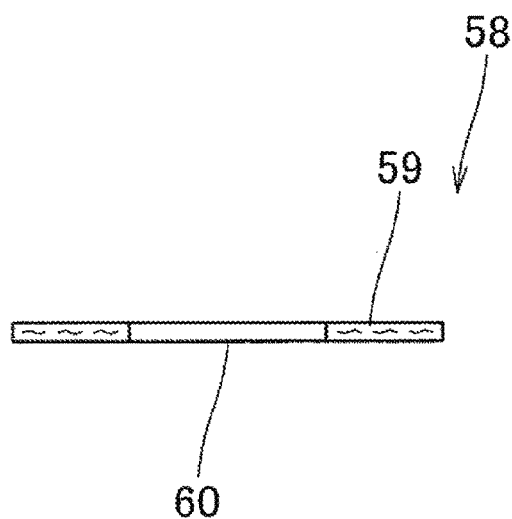
FIG. 9 is a sectional view of IX-IX portion of FIG. 8.

The connection part 63 is set such that a width dimension H2 is smaller than a width dimension H3 of the mounting piece 59 in a transverse direction (see FIG. 8). Specifically, the connection part 63 is set such that the width dimension H2 is about one third of a width dimension H3 of the mounting piece 59 in the transverse direction. In addition, in the case of the embodiment, the connection part 63 is configured such that one end edge (in the case of the embodiment, an inner edge on the inboard side at the time of loading in the vehicle) is continuous to the end edge of the mounting piece 59, and the other side (an outer edge on the outboard side at the time of loading in the vehicle) is recessed with respect to the mounting piece 59.

Figure 10:
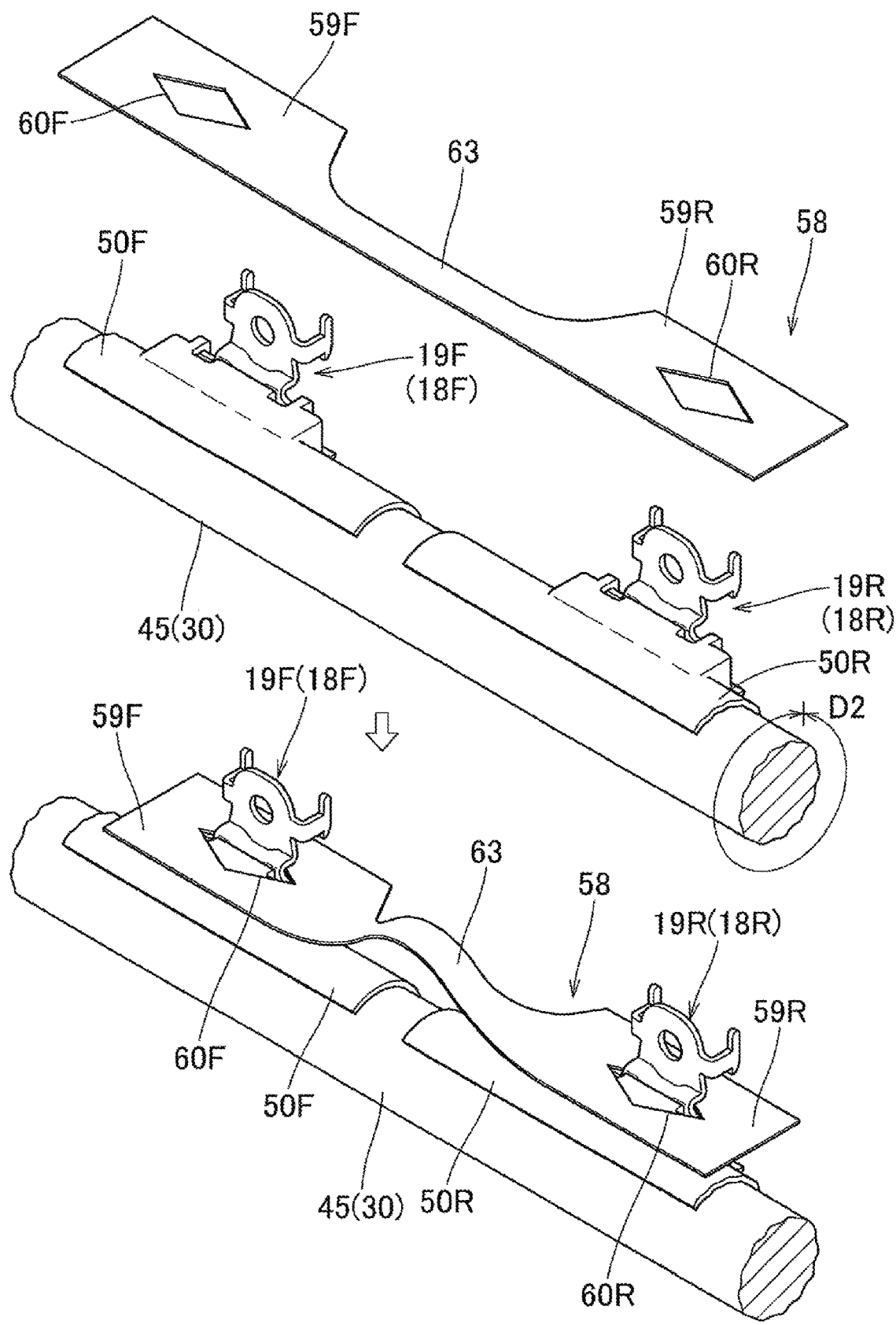
FIG. 10 is a partially enlarged perspective view schematically illustrating a state where the regulation member is mounted in the mounting piece of the mounting bracket in a state where the completely folded body is stored in a case in the head-protecting airbag device of the embodiment.

The regulation member 58 is set such that a length dimension of the portion between the assembly holes 60F and 60R is a length dimension that disenables one turn of twist in the circumferential direction of the completely folded body 45. In detail, the length dimension L1 of the portion between the centers of the assembly holes 60F and 60R is set to be a dimension that allows the completely folded body 45 to be bent in the portion between the cases 50F and 50R at the time of conveyance and disenables one turn of twist of the completely folded body 45 in the portion between the cases 50F and 50R. Specifically, the length dimension L1 is set to be about a sum of a separation distance D1 (see FIG. 2) between the centers of the mounting pieces 19F and 19R protruding from the cases 50F and 50R and a circumferential distance D2 (see FIG. 10) in a sectional surface of the completely folded body 45 in an axis orthogonal direction in the completely folded body 45. The length dimension L1 is set to allow a half turn of twist in the circumferential direction of the completely folded body 45.

Figure 11:
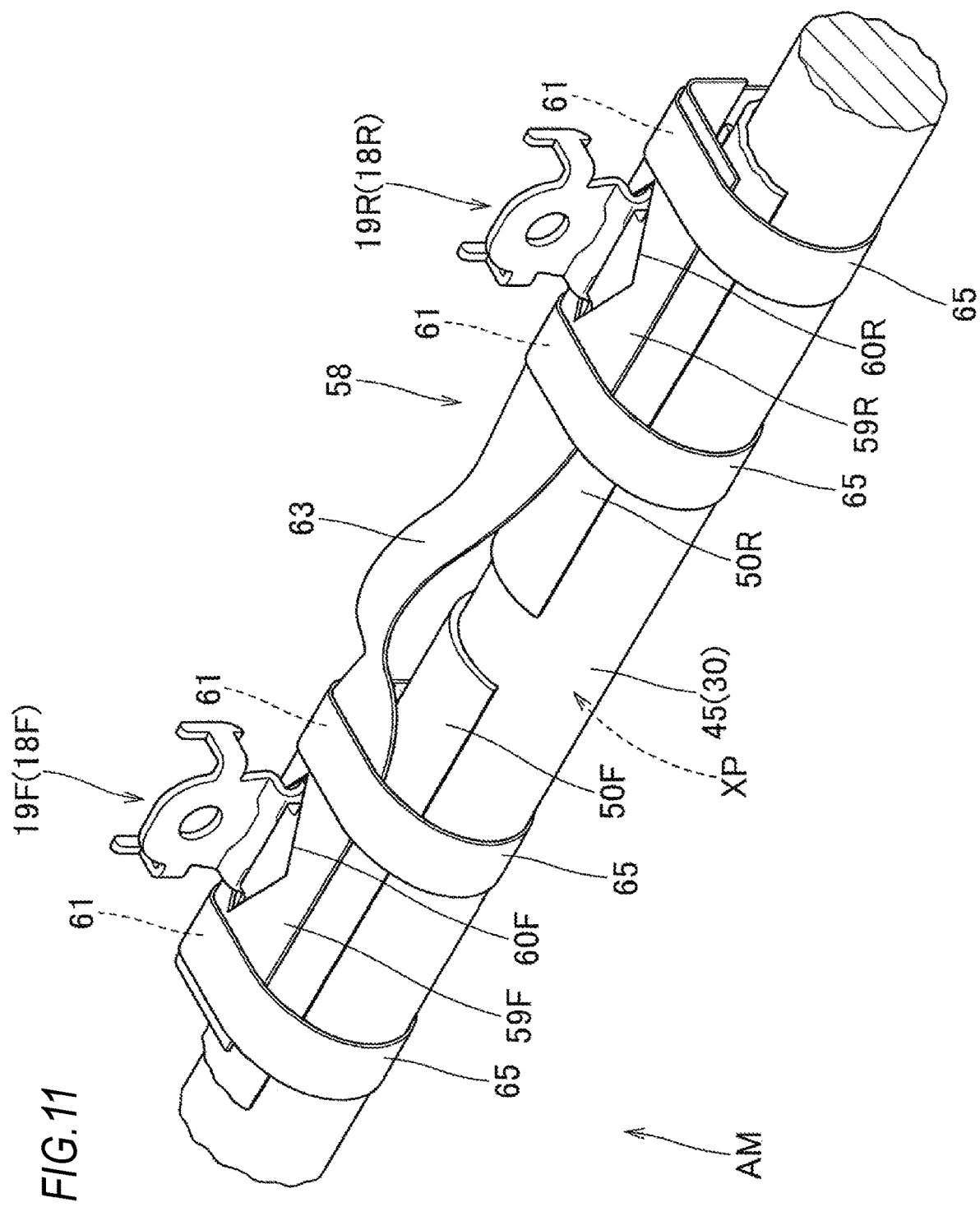
FIG. 11 is a partially enlarged perspective view schematically illustrating an airbag assembly in the head-protecting airbag device of the embodiment.

In a state where the mounting pieces 19F and 19R of the mounting brackets 18F and 18R protruding from the cases 50F and 50R are arranged to be inserted into the assembly holes 60F and 60R so as to cover the outer circumference of the cases 50F and 50R (see FIG. 12), the tape materials 65 which are breakable at the time of inflation of the airbag 30 wind the wound portions 61 of both front and rear sides of each of the assembly holes 60F and 60R in the mounting pieces 59F and 59R together with the cases 50F and 50R and the completely folded body 45. Thus, as illustrated in FIG. 11, the regulation member 58 is arranged around the completely folded body 45.

Next, the description will be given about the loading of the head-protecting airbag device M of the embodiment into the vehicle V. First, the completely folded body 45 which is long in the front and rear direction is formed when the airbag body 31 is folded such that the lower edge 31b is brought close to the upper edge 31a from a state where the inboard wall part 32a and the outboard wall part 32b are overlapped in the flatly-deployed state. Further, after the completely folded body 45 is formed, a breakable wrapping materials for collapse prevention (not illustrated) wraps the predetermined place around the completely folded body 45.

Next, the connection tap 43 in a state where the mounting bracket 18 is inserted into the connection hole 24 is sewn with the upper edge 31a of the airbag body 31 exposed in the upper surface of the completely folded body 45 by using a suture. Thereafter, the completely folded body 45 is stored inside from below to be stored in the cases 50F and 50R, and the connection plate part 23 of the mounting bracket 18 is engaged with the engaging claw part 52, such that the mounting piece 19 protrudes from the cases 50F and 50R. Further, the regulation member 58 is arranged such that the mounting pieces 19F and 19R of the mounting brackets 18F and 18R protruding from the cases 50F and 50R are inserted into the mount holes 60F and 60R to cover the outer circumference of the cases 50F and 50R (see FIG. 10). The front and rear portions (wound portion) of the mount holes 60F and 60R in the mounting pieces 59F and 50R are wrapped by the tape materials 65 together with the cases 50F and 50R and the completely folded body 45 (see FIG. 11). Next, the inflator 12 having mounted with the mounting bracket 14 is connected with the connection opening part 35 of the airbag 30 by using the clamp 13, thereby forming an airbag assembly AM (see FIG. 12).

Figure 12:
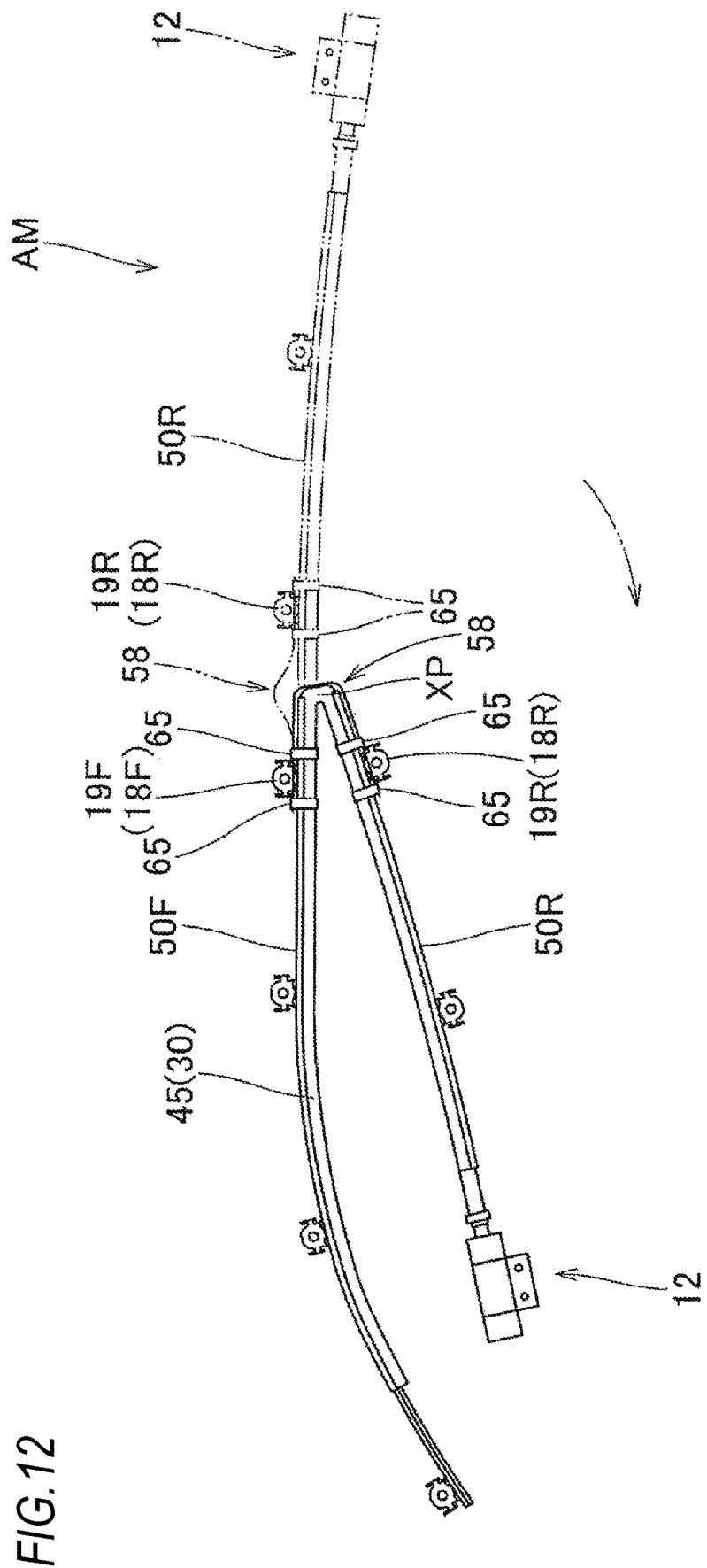
FIG. 12 is a schematic view illustrating a state where the airbag assembly is bent in the head-protecting airbag device of the embodiment.

In the embodiment, as illustrated by a solid line from a two-dot chain line of FIG. 12, the airbag assembly AM is bent in the portion (the arranged portion of the regulation member 58) between the cases 50F and 50R such that the cases 50F and 50R are arranged outward (the regulation member 58 is arranged in the outer circumference of the bent portion XP), whereby the airbag assembly AM can be compact. When the head-protecting airbag device M is loaded in the vehicle V, as illustrated by the two-dot chain line from the solid line of FIG. 12, the airbag assembly AM is recovered from the bent state to release the folding of the bent portion XP (the arranged portion of the regulation member 58). Further, the mounting brackets 14 and 18 are arranged in the predetermined places of the inner panel 2 of the body 1, and are locked by the bolts 15 and 26. A lead wire (not illustrated) extending from a control device for operating a predetermined inflator is connected to the inflator 12, and the front pillar garnish 5 or the roof head liner 6 is mounted in the inner panel 2 of the body 1. Further, the central pillar garnish 7 and the rear pillar garnish 8 are mounted in the inner panel 2 of the body 1, whereby the head-protecting airbag device M can be loaded in the vehicle V.

After the head-protecting airbag device M is loaded in the vehicle V, when an operation signal is received from the control device to operate the inflator 12 and the inflation gas discharged from the inflator 12 flows in the airbag body 31, the inflating airbag body 31 breaks the tape material 65 or the wrapping material (not illustrated) which mounts the regulation member 58, and presses and opens the airbag cover 10 to be deployed to protrude downward from the storage portion P. As illustrated by the two-dot chain line of FIG. 1, the inflating airbag body is inflated completely to cover the inboard side of the windows W1 and W2 or a portion of the central pillar part CP and the rear pillar part RP.

Further, the head-protecting airbag device M of the embodiment is configured such that the regulation member 58 arranged around the bent portion XP at the time of conveyance in the completely folded body 45 formed by folding the airbag 30 can regulate the twist of the completely folded body 45 at the bent portion XP. Specifically, the regulation member 58 is set such that the length dimension L1 of the portion (connection part 63) between the assembly holes 60F and 60R is a length dimension that disenables one turn of twist in the circumferential direction of the completely folded body 45. That is, in the head-protecting airbag device M of the embodiment, before the completely folded body 45 is rotated by one turn, the regulation member 58 is twisted and stretched together with the outer circumference of the completely folded body 45 not to be rotated further. Thus, it can be regulated accurately that when the completely folded body 45 is assembled with the vehicle V after the conveyance, the completely folded body 45 is twisted to be rotated by one turn in the bent portion XP. In addition, in a state where the both ends of the regulation member 58 formed as a belt-shaped body are engaged with the mounting pieces 19F and 19R as the protrusion parts protruding from the completely folded body 45, the tape materials 65 as a wrapping material which is breakable at the time of inflation of the airbag 30 wind the completely folded body 45 in the positions of both front and rear sides of the mounting pieces 19F and 19R, whereby the regulation member 58 is mounted in the completely folded body 45. Thus, the regulation member 58 is simply mounted in the completely folded body 45, and it can be accurately prevented that the mounting pieces 19F and 19R are deviated from the assembly holes 60F and 60R. For this reason, even when the head-protecting airbag device M of the embodiment includes the regulation member 58 which regulates the twist of the completely folded body 45, the head-protecting airbag device M can be configured to be compact without getting bulky. In addition, it can be prevented that the completely folded body 45 is twisted to be rotated by one turn (in the case of the embodiment, the completely folded body 45 is twisted only by a half turn). Thus, when the twist occurs, the posture of the completely folded body 45 becomes unnatural. The mounting piece 19 which should be visible is not viewed, or the mounting piece 19 is visibly arranged on the opposite side, so that the twist state can be directly recognized visibly, thereby accurately preventing the twist of the completely folded body 45.

Therefore, with a simple configuration, in the head-protecting airbag device M of the embodiment, it can be regulated that the twist occurs in the area of the bent portion XP of the completely folded body 45 at the time of conveyance.

In the head-protecting airbag device M of the embodiment, the protrusion part which is inserted into the assembly hole 60 of the regulation member 58 is formed of the mounting piece 19 of the mounting bracket 18 as a mounting unit for mounting and fixing the upper edge 31a of the airbag 30 in the body 1. The opening shape of the assembly hole 60 is configured such that the central side (the center in the front and rear direction) in the direction along the completely folded body 45 is widened, and the both end sides (the both end sides in the front and rear direction) in the direction along the completely folded body 45 are narrowed. For this reason, the mounting piece 19 can be smoothly inserted into the assembly hole 60. Compared to a case where the assembly hole is formed simply in a slit shape, when the mounting piece 19 is mounted in the inner panel 2 of the body 1 (when the bolt 26 is fastened), the central portion in the front and rear direction in the periphery of the assembly hole 60 hardly enters between the mounting piece 19 and the inner panel 2 of the body 1, and it can be accurately prevented that the central portion in the front and rear direction in the periphery of the assembly hole 60 is interposed in the area between the mounting piece 19 and the inner panel 2 of the body 1. Incidentally, if such a point is not taken into consideration, the assembly hole may be formed in the slit shape even in a case where the mounting unit is inserted. In addition, in the embodiment, the assembly hole 60 is formed in a rhombic shape, but the outer shape of the assembly hole is not limited to the embodiment. For example, an elliptic shape may be adopted in which the center in the front and rear direction is widened, and the both ends in the front and rear direction are narrowed. In addition, in the head-protecting airbag device M of the embodiment, the assembly holes 60 of the both ends of the regulation member 58 are configured such that the mounting piece 19 of the mounting bracket 18 for mounting and fixing the upper edge 31a of the airbag 30 in the body 1 is inserted thereto. However, a protruding portion which is separately provided in the case may be used as the protrusion part which is inserted into the assembly hole. Further, in the head-protecting airbag device M of the embodiment, the mounting piece 19 of the mounting bracket 18 for locking the bolt 26 in the inner panel 2 is used as a mounting unit which mounts the upper edge 31a of the airbag 30 in the inner panel 2 of the body 1. However, the mounting unit is not limited to the embodiment. For example, a type of the mounting bracket may be used in which two plate-shaped bodies may be arranged in both sides of the mounting piece to extend from the upper edge of the airbag, and the plate-shaped bodies are caulked to each other to be fixed in the mounting piece, or a configuration may be used in which a mounting clip for fixation to the inner panel is firmly fixed in the mounting piece extending from the upper edge of the airbag.

In the head-protecting airbag device M of the embodiment, as a configuration in which the completely folded body 45 is stored in the cases 50F and 50R made of a synthetic resin and is loaded in the vehicle V, the regulation members 58 are arranged in the outer circumference of the cases 50F and 50R in the vicinity of the boundary portion of the cases 50F and 50R arranged adjacently, whereby it can be accurately prevented that the twist occurs in the area between the cases 50F and 50R in the completely folded body 45

In the head-protecting airbag device M of the embodiment, the regulation member 58 is set such that the width dimension of the connection part 63 connecting the mounting pieces 59F and 59R is smaller than the width dimension of the mounting pieces 59F and 59R in the transverse direction. Thus, compared to a case where the width dimension of the connection part is set to be substantially the same as the width dimension of the mounting piece, the reduction in weight can be achieved, and a bending operation of the completely folded body 45 at the time of conveyance is facilitated. In addition, it can be suppressed that the connection part 63 interferes with the peripheral member. Incidentally, in the embodiment, the connection part 63 is configured such that the inner edge which is on the inboard side at the time of loading in the vehicle is continuous to the end edge of the mounting piece 59, and the outer edge which is on the outboard side at the time of loading in the vehicle is recessed with respect to the mounting piece 59. However, the outer shape of the regulation member is not limited to the embodiment. The connection part may be configured such that the outer edge which is on the outboard side at the time of loading in the vehicle is recessed with respect to the mounting piece, or both sides of the inner edge and the outer edge are recessed with respect to the mounting piece.

Incidentally, in the embodiment, the tape material which is breakable at the time of inflation of the airbag is used as a wrapping material that enables the wrapping state to be released at the time of inflation of the airbag. However, for example, a binding band in which a binding state can be released at the time of inflation of the airbag may be used as a wrapping material.

What is claimed is:

1. A head-protecting airbag device comprising:
   an airbag which is configured to cover a window of a vehicle at a time of deployment and inflation and is stored in a storage portion formed in an upper edge on an inboard side of the window in a state where an upper edge is mounted and fixed in a body of the vehicle, the airbag being loaded in the vehicle as a long completely folded body folded to be storable in the storage portion, and the completely folded body being bent at a predetermined place to be conveyable before being loaded in the vehicle; and
   a regulation member to be arranged near a bent portion in the completely folded body at a time of conveyance, the regulation member being formed of a belt-shaped body having flexibility and being capable of regulating a twist of the completely folded body at the bent portion when the completely folded body is assembled into the vehicle, wherein:

the regulation member includes an assembly hole on each of both ends, which is configured to be engaged with a protrusion part formed to protrude from the completely folded body;

in a state where the protrusion part is engaged with a periphery of the assembly hole, both front and rear sides of the protrusion part are wrapped together with the completely folded body by a wrapping material, in which a wrapping state is releasable at a time of inflation of the airbag, thereby being mounted in the completely folded body;

a length dimension of a portion between the assembly holes is set to be a length dimension which disenables one turn of twist in a circumferential direction of the completely folded body; and the regulation member and the completely folded body are integrally wrapped by the wrapping material in a state where the regulation member is overlapped on the completely folded body.

2. The head-protecting airbag device according to claim 1, wherein:

at least one of the protrusion parts is formed of a mounting unit for mounting and fixing the upper edge of the airbag in the body; and an opening shape of the assembly hole into which the mounting unit is inserted is formed such that a center in a direction along the completely folded body is widened, and both ends in the direction along the completely folded body are narrowed.

3. The head-protecting airbag device according to claim 1, wherein:

the completely folded body is stored in a case made of a synthetic resin and is loaded in the vehicle; and the regulation member is arranged in an outer circumference of the case in a vicinity of a boundary portion of the cases arranged adjacently.

4. The head-protecting airbag device according to claim 1, wherein:

the regulation member includes mounting pieces including the assembly holes and a connection part connecting the mounting pieces; and the connection part is set such that a width dimension is smaller than a width dimension of the mounting piece.

\* \* \* \* \*